United States Patent Office 2,937,211
Patented May 17, 1960

2,937,211

CHEMICAL PROCESS

Richard Eli Ludwig, Wilmington, Del., assignor to E. I. du Pont de Nemours and Company, Wilmington, Del., a corporation of Delaware No Drawing. Application October 17, 1958
Serial No. 767,790

2 Claims. (Cl. 260—666)

The present invention describes an improved synthesis for adamantane.

Adamantane (tricyclo[3.3.1.1³,⁷]decane) has the following structural formula:

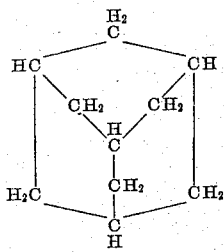

As is illustrated, each of the carbon atoms is a member of at least two of the four ring systems, all of which are equivalent. Consequently, this structure is exceptionally rigid and allows no movement of the individual atoms. This feature and the symmetry of the molecule are responsible to a great extent for the unusual physical and chemical properties evidenced by adamantane.

The unique structure of the molecule has caused great interest in studying both the parent compound and various derivatives thereof. However, the exploration of the field has been curtailed due to the difficulty in obtaining adamantane. Minute yields of adamantane were first isolated in 1933 by chilling houdonin (naphtha petroleum) to —80° C. Subsequently, various syntheses were attempted, but the maximum yields obtained thereby did not exceed five percent. Additionally, the known synthetic routes started with expensive and inaccessible reactants and required a plurality of intermediate steps to obtain only a small amount of desired product.

The most recent and, to date, the most economical preparation of adamantane is reported in the Journal of the American Chemical Society, 79, 3292 (June 20, 1957). This reference describes obtaining a ten percent yield of adamantane by refluxing endotentrahydrodicyclopentadiene, obtained by the catalytic hydrogenation of dicyclopentadiene, in the presence of a catalytic amount (ten percent by weight based on the weight of the reactant) of aluminum chloride. The product mixture obtained by the aforedescribed process contains approximately ten percent of the desired product, fifty percent of the exo form of the starting material, and forty percent of a tarry mass. Although this method represents the best synthesis to date with respect to the yield of adamantane, there are features inherent therein that attenuate the practicability and preclude commercial exploitation thereof. The reaction time, for example, was approximately twelve hours (i.e., overnight). Furthermore, the recovery of the product was complicated both by the nature of the catalyst and the presence of the tarry by-products.

Accordingly, an object of the present invention is to synthesize adamantane in higher yields than hitherto possible. A further object is to synthesize adamantane without the formation of tarry by-products. Another object s to provide a synthesis for adamantane which does not require excessively long reaction times. Additional objects of the present invention will become apparent as the invention is described in greater detail.

I have found that the foregoing objects are attained by rearranging tetrahydrodicyclopentadiene in the presence of hydrogen fluoride and boron trifluoride. In accordance with the present invention, tetrahydrodicyclopentadiene is introduced into a reaction vessel containing at least one mole of anhydrous hydrogen fluoride per mole of reactant, said reaction vessel being pressurized sufficiently with boron trifluoride to maintain at least part of the hydrogen fluoride in the liquid phase. The reaction temperature may vary from room temperature to the decomposition temperature of the tetrahydrodicyclopentadiene, the exact temperature selected being dependent on the desired reaction time and yield.

In order to describe the invention more fully, reference now is made to the following examples. The examples are illustrative only and are not to be construed as limiting the invention in any manner. In the examples, the parts are parts by weight.

Example 1

A reactor containing 150 parts of endotetrahydrodicyclopentadiene and 20 parts of anhydrous hydrogen fluoride was pressurized to 750 pounds per square inch gage by boron trifluoride. The reaction mixture was heated gradually (over a three-hour period) to 80° C. and maintained at this temperature for an additional one and one-half hours. During the reaction, the pressure rose autogenously. The reaction vessel was cooled to room temperature (29° C.) and vented. The reaction mixture was diluted by water and extracted by petroleum ether (B.P. 30–60° C.). When the ether extract was cooled, 27 parts of a white solid, M.P. 266–268° C., crystallized which subsequently was identified as adamantane by a mixed melting point with an authentic sample. The conversion to adamantane was 18%. Additionally, 101 parts of exotetrahydrodicyclopentadiene, suitable for recycle, was recovered. No tarry by-products were formed.

Example 2

The general procedure outlined in the previous example was followed with the conditions varying as tabulated.

| HF Parts | THDCP¹ Parts | Temp. (° C.) | Time (min.) | Adamantane, Percent Conv. |
|---|---|---|---|---|
| 22 | 24.5 | 28 | 120 | 4.6 |
| 22 | 24.5 | 50 | 60 | 32.2 |
| 22 | 24.5 | 50 | 20 | 20.6 |
| 22 | 24.5 | 150 | 20 | 30.0 |
| 28 | 24.5 | 200 | 5 | 16.6 |

¹ THDCP—endotetrahydrodicyclopentadiene.

Example 3

In accordance with the procedure described in Example 1, 49 parts of exotetrahydrodicyclopentadiene recovered from previous runs and 42 parts of anhydrous hydrogen fluoride were heated to 50° C. for one hour in a reaction vessel pressurized by 750 pounds per square inch gage boron trifluoride. A conversion to adamantane of 8% was obtained.

Example 4

Heating 2 parts of anhydrous hydrogen fluoride, i.e., a catalytic amount, and 49 parts of tetrahydrodicyclopentadiene to 50° C. for one hour in a suitable reaction vessel pressurized to 750 pounds per square inch gage by boron trifluoride yielded no adamantane.

*Example 5*

The same general procedure outlined in Example 1 was followed except that the reaction vessel was pressurized with nitrogen instead of boron trifluoride. No adamantane was isolated.

As can be seen from the previous examples, by the process of the present invention a conversion to adamantane of over thirty percent can be obtained at a low reaction temperature after only a one-hour reaction period. This represents a significant improvement over all the prior art processes with respect to conversion. Additionally, the product mixture does not contain tarry byproducts obtained by the known aluminum chloride-catalyzed rearrangement of tetrahydrodicyclopentadiene. Furthermore, the product mixture obtained by the method of the present invention contains only the desired product and the exo form of starting material which may be recycled to increase the conversion to and yield of adamantane.

The aforediscussed advantages obtained by rearranging tetrahydrodicyclopentadiene in the presence of hydrogen fluoride and boron trifluoride instead of in the presence of catalytic quantities of aluminum chloride are surprising. Although this mixture has been deemed equivalent to aluminum chloride in many alkylation, isomerization, and polymerization reactions, it is now seen that in the particular reaction of the present invention, the hydrogen fluoride-boron trifluoride mixture is superior to aluminum chloride with respect to conversion to and recovery of adamantane. Additionally, conclusive evidence that the role of the hydrogen fluoride-boron trifluoride mixture is different and not analogous to that of the aluminum catalyst is shown in Example IV. In all the examples of the instant specification, the amount of hydrogen fluoride is the limiting quantity with respect to possible complex formation since the boron trifluoride is present in such large amounts. In Example 4, it is seen that adamantane is not produced in the presence of only catalytic quantities of this limiting agent. Consequently, it will be recognized by those skilled in the art that the hydrogen fluoride-boron trifluoride is not a simple isomerization catalyst in the present process.

The operable temperature range of the reaction is quite flexible and may vary from room temperature (20° C.) to the decomposition temperature of the tetrahydrodicyclopentadiene. Obviously, the rate of reaction and the percent yield are dependent to some extent on the specific temperature selected and for that reason, it is economically advantageous to employ a temperature above 40° C.

The amount of pressure employed is not critical provided that it is sufficient to maintain at least a part of the hydrogen fluoride in the liquid phase, this requirement obviously being dependent to a large extent on the reaction temperature. The upper limit of pressure is determined by economic and mechanical, not chemical, considerations. The specific amount of pressure exemplified, i.e. 750 pounds per square inch gage boron trifluoride, was chosen arbitrarily within the above discussed limitations and is not to be construed as limiting the invention in any manner.

One of the critical features of the present invention is the presence of anhydrous hydrogen fluoride in at least a mole to mole ratio based on the tetrahydodicyclopentadiene. As exemplified, the presence of small amounts of hydrogen fluoride do not lead to the formation of adamantane. Excess hydrogen fluoride, however, is desirable and serves as a reaction solvent. In addition to the employment of a sufficient amount, the hydrogen fluoride must be anhydrous as the presence of any water is deleterious to the reaction and substantially reduces the amount of adamantane formed.

The invention has been described in detail in the foregoing. However, many modifications not specifically mentioned will occur to those skilled in the art. For instance, part of the pressure could be contributed by an inert agent such as nitrogen. Accordingly, I intend to be limited only by the following claims.

I claim:

1. A method for preparing adamantane comprising rearranging tetrahydrodicyclopentadiene at between room temperature and the decomposition temperature of said reactant with at least one mole of hydrogen fluoride per mole of reactant in the presence of boron trifluoride, said reaction mixture being under sufficient pressure to maintain at least part of the hydrogen fluoride in a liquid phase.

2. A method for preparing adamantane according to claim 1 wherein the reaction temperature is between 45° C. and 200° C.

References Cited in the file of this patent

UNITED STATES PATENTS

| | | |
|---|---|---|
| 2,446,998 | Burk | Aug. 17, 1948 |
| 2,734,093 | Schneider et al. | Feb. 7, 1956 |
| 2,766,301 | Buchner et al. | Oct. 9, 1956 |
| 2,831,037 | Schmerling | Apr. 15, 1958 |

OTHER REFERENCES

Schleyer: "Journal of the American Chemical Society," vol. 79, 1957 (p. 3292 relied on).